May 7, 1929.  B. C. EBERHARD  1,712,335
METHOD OF MAKING INNER TUBES
Filed March 10, 1928
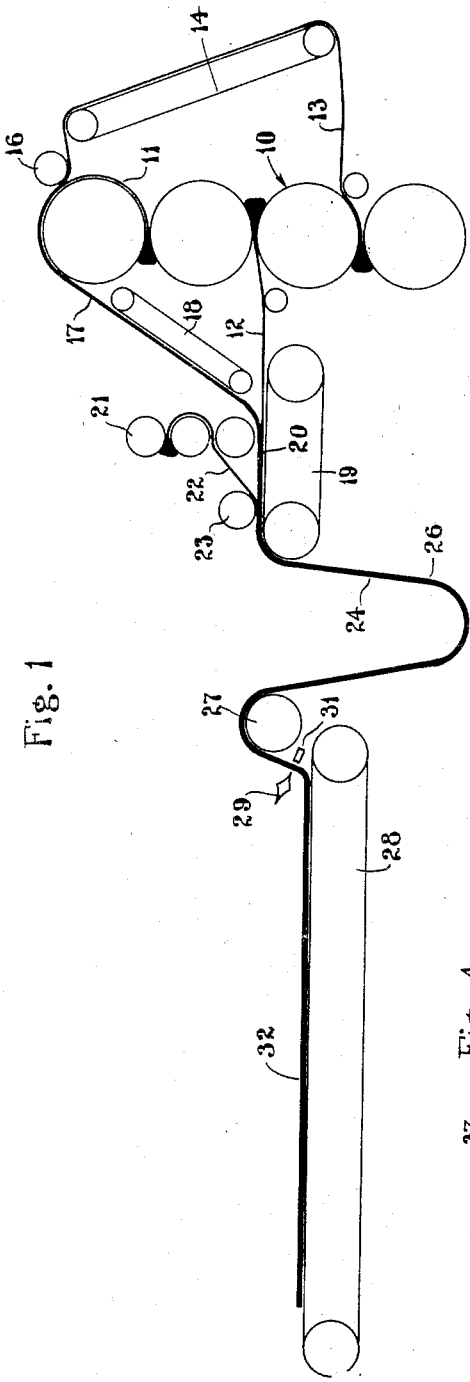
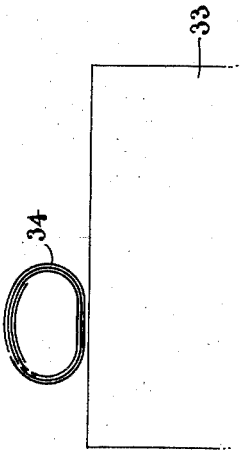
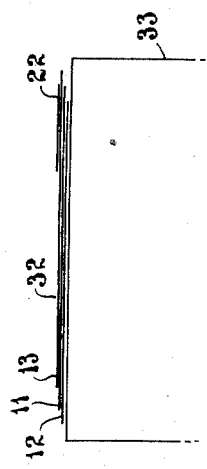
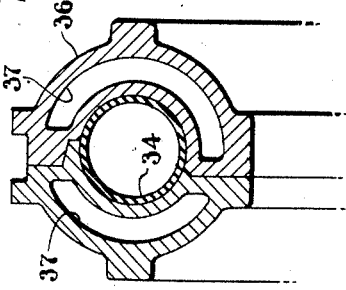
Inventor
Boyd C. Eberhard
By
Attorney Patented May 7, 1929.

1,712,335

UNITED STATES PATENT OFFICE.

BOYD C. EBERHARD, OF AKRON, OHIO, ASSIGNOR TO THE GOODYEAR TIRE & RUBBER COMPANY, OF AKRON, OHIO, A CORPORATION OF OHIO.

METHOD OF MAKING INNER TUBES.

Application filed March 10, 1928. Serial No. 260,612.

My invention relates generally to a method of molding annular articles, and it has particular relation to a method of the above designated character for manufacturing reinforced molded inner tubes for pneumatic tire casings.

One object of the invention is to provide a method of manufacturing molded inner tubes in which the outer and inner peripheral portions thereof will have substantially equal thicknesses.

Another object of the invention is to provide a method of manufacturing molded inner tubes, having relatively uniform thicknesses at the outer and inner peripheral portions thereof, by employing continuous strips of stock having substantially uniform thicknesses.

Prior to the invention, molded inner tubes for pneumatic tire casings have been manufactured by a method involving the employment of an extruding machine having a slightly eccentric die which formed a continuous tube having a non-uniform thickness. The continuous tube was severed into predetermined lengths which were so spliced at their opposite ends as to form an annular tube having an outer peripheral portion which was substantially thicker than the inner peripheral portion thereof. The tube was inserted in a mold and inflated by the application of compressed fluid to the interior thereof, which caused the relatively thick outer peripheral portion to be slightly stretched in conforming to the configuration of the mold cavity. Consequently, the thickness of the outer peripheral portion of the tube was decreased slightly to a value substantially equal to the thickness of the inner peripheral portion thereof. The outer and inner peripheral portions of the tube, when removed from the mold, retained the relative thickness established therein.

The invention comprises a method of manufacturing molded inner tubes of uniform thickness by the employment of a continuously formed laminated strip which is composed of a plurality of separately formed strips having substantially uniform thicknesses. One of the separately formed strips is relatively narrower than the others and this strip is superposed upon the others at one side of the middle portions thereof. Thus reinforced, the laminated strip is severed into suitable lengths of material which are spliced at opposite ends and folded to form annular tubes. In each of the tubes the reinforced portion is located at the outer periphery thereof. The tubes are separately inflated and cured in an annular mold, wherein the thickness of the reinforced portion of a tube is reduced until it is equal substantially to the thickness of the inner peripheral portion thereof.

For a better understanding of the invention, reference may now be had to the accompanying drawings, forming a part of this specification, in which:

Fig. 1 is a diagrammatical illustration of an apparatus for manufacturing inner tubes according to one form of the invention;

Fig. 2 is a fragmentary cross-sectional view of a tube-forming drum taken substantially on line II—II of Fig. 1;

Fig. 3 also is a fragmentary cross-sectional view of a tube-forming drum taken substantially on line II—II of Fig. 1 and illustrating a method of forming a tube upon the drum; and Fig. 4 is a fragmentary cross-sectional view of a mold employed in curing inner tubes for pneumatic tire casings.

In practicing the invention, a plurality of rubber strips 11, 12 and 13, having substantially equal widths, are formed by a continuously operating calender 10. A conveyor 14 transports the strip 13 to a position adjacent one of the calender rolls employed in forming the strip 11 where it is stitched to the latter by a roll 16. A two ply strip 17, comprising the united strips 11 and 13, is transported by a conveyor 18 and deposited on a conveyor 19, where it is united with the strip 12 to form a three ply strip 20. As best shown by Fig. 2 the strips 11, 12 and 13 composing the strip 20 are so assembled as to provide progressively stepped margins between the adjacent edges of the strips.

A small calender 21, positioned above the conveyor 19, forms a relatively narrow continuous strip 22, which is stitched by a roller 23 along one side of the strip 20 to form a strip 24 composed of longitudinal portions having three and four ply thicknesses. The strip 24 is suspended in a loop 26 between the conveyor 19 and an intermittently operating roller 27 which discharges the strip 24 upon an intermittently operating conveyor 28. The conveyor 28 and the roller 27 are operable simultaneously and at substantially equal peripheral speeds. The length of the strip 24 deposited upon the conveyor 28 is severed by the operation of a cutter 29 acting against a bar 31 which is disposed transversely with respect to the strip 24 between the end of the conveyor 28 and the roller 27. A blank 32, formed by the operation of the cutter 29, then is removed from the conveyor 28 and is formed into an endless band upon a drum 33. An edge of the blank 32, having the strip 22 deposited thereon, is then folded over the remaining portion of the strip and stitched to the opposite edge thereof.

It will be noted that the inner peripheral portion of a tube 34 thus formed is composed of three-ply material while the outer portion thereof has a four-ply thickness. Thereafter the tube 34 is removed from the drum 33 and inserted in a suitable mold 36 where it is inflated and cured by steam within the jackets 37 thereof. When the outer peripheral portion of the tube 34 is expanded, in order to occupy the outer peripheral portion of the mold 36, its thickness becomes substantially equal to the thickness of the inner peripheral portion thereof.

From the foregoing description, it is apparent that the invention embodies a very efficient and economical method of making inner tubes for pneumatic tire casings. Obviously the resulting product has many features and advantages that are not embodied in inner tubes which have been constructed by other methods heretofore employed.

Although I have illustrated but the preferred form which the invention may assume, and have described that form in detail, it will be apparent to those skilled in the art that the invention is not so limited, but that various modifications may be made therein without departing from the spirit of the invention or from the scope of the appended claims.

What I claim is:

1. A method of making rubber tubes which comprises continuously forming a strip of rubber tube stock, continuously forming and applying to the first strip, a relatively narrow reinforcing strip, severing the assembled strip into blanks, forming the blanks into endless tubes and then molding the tubes.

2. A method of making rubber tubes which comprises continuously forming a strip having reinforced portions longitudinally thereof, forming the strip into endless tubes, and then molding the tubes.

3. A method of making rubber tubes which comprises continuously forming a relatively wide, and a narrower rubber strip, progressively stitching the strips together, forming the composite strip into endless tubes and then molding the tubes.

4. A method of making rubber tubes which comprises continuously forming a relatively wide, and a narrower rubber strip, stitching the strips together, forming the composite strip into endless tubes and molding the latter with the narrower strip around the outer periphery thereof.

5. A method of molding rubber which comprises continuously forming a relatively wide, and a narrower rubber strip, progressively stitching the strips together, severing the composite strip into blanks, forming the blanks into endless bands, folding the portion of the band, having the narrower strip thereon, over upon the remaining portion thereof, stitching the edges of the band together to form a tube, and curing the latter in an annular mold.

In witness whereof, I have hereunto signed my name.

Signed at Akron, in the county of Summit and State of Ohio, U. S. A., this 9th day of March, 1928.

BOYD C. EBERHARD.